United States Patent
Tretiakoff et al.

(10) Patent No.: US 6,893,263 B2
(45) Date of Patent: May 17, 2005

(54) SINGLE DOT TACTILE READING MODULE DRIVEN BY A SHAPE MEMORY WIRE

(76) Inventors: Oleg Tretiakoff, 9500 S. Ocean Dr., Islandia 2, Jensen Beach, FL (US) 34957; Andree Tretiakoff, 9500 S. Ocean Dr., Islandia 2, Jensen Beach, FL (US) 34957

( * ) Notice: Subject to any disclaimer, the term of this patent is extended or adjusted under 35 U.S.C. 154(b) by 215 days.

(21) Appl. No.: 10/269,041

(22) Filed: Oct. 11, 2002

(65) Prior Publication Data

US 2003/0073058 A1 Apr. 17, 2003

(30) Foreign Application Priority Data

Oct. 15, 2001 (FR) .............................................. 01 13692

(51) Int. Cl.⁷ .............................................. G09B 21/00
(52) U.S. Cl. ...................... 434/113; 434/112; 434/114; 340/407.1
(58) Field of Search .......................... 434/112–115, 365; 340/407.1, 825.19; 345/156, 173; 310/322; 251/129.01

(56) References Cited

U.S. PATENT DOCUMENTS

| | | | |
|---|---|---|---|
| 4,633,121 A | * 12/1986 | Ogawa et al. ............... | 310/332 |
| 4,664,632 A | 5/1987 | Tretiakoff et al. | |
| 4,758,165 A | * 7/1988 | Tieman et al. ............... | 434/114 |
| 4,898,536 A | * 2/1990 | Hoffarth ...................... | 434/114 |
| 5,086,287 A | 2/1992 | Nutzel | |
| 5,165,897 A | 11/1992 | Johnson | |
| 5,226,817 A | * 7/1993 | Nakajima et al. ............ | 434/113 |
| 5,449,292 A | * 9/1995 | Tani et al. ................... | 434/114 |
| 5,685,721 A | * 11/1997 | Decker ........................ | 434/114 |
| 5,718,588 A | 2/1998 | Tretiakoff et al. | |
| 5,842,867 A | * 12/1998 | Hong et al. .................. | 434/114 |
| 6,022,220 A | * 2/2000 | Haugen ....................... | 434/112 |
| 6,109,922 A | * 8/2000 | Litschel et al. .............. | 434/114 |
| 6,354,839 B1 | * 3/2002 | Schmidt et al. .............. | 434/113 |
| 6,445,284 B1 | * 9/2002 | Cruz-Hernandez et al. ........................ | 340/407.1 |
| 6,657,617 B2 | * 12/2003 | Paolini et al. ............... | 345/173 |
| 6,693,516 B1 | * 2/2004 | Hayward .................. | 340/407.1 |
| 6,697,043 B1 | * 2/2004 | Shahoian ..................... | 345/156 |
| 6,705,868 B1 | * 3/2004 | Schleppenbach et al. ... | 434/114 |
| 6,734,785 B2 | * 5/2004 | Petersen ................... | 340/407.1 |
| 2004/0108479 A1 | * 6/2004 | Garnier et al. ......... | 251/129.01 |

OTHER PUBLICATIONS

Electronic Braille Output Device Using Nitinol, NIH Grant No. 2 R44 EY06512–02, TiNi Alloy Company, Feb. 9, 1990.

* cited by examiner

*Primary Examiner*—Joe H. Cheng
(74) *Attorney, Agent, or Firm*—Jacobson Holman PLLC

(57) ABSTRACT

Single dot tactile reading module including a tactile dot, driven by a rotation of a cam around its axis, either directly or through a pair of levers. A shape memory alloy wire is attached on one hand to a rod which ends can slide in slots cut in internal faces of the cam, on the other hand to a rod held in a fixed position at the bottom of the tactile module. The wire contraction, produce by Joule heating, rotates the cam which in turn moves the dot up or down depending on the direction of the rotation. The wire cooling, accelerated by a heat sink allows the return of the wire to its initial length with help of a spring which pushes the rod from one end to the opposite end of the slots the cam being prevented from rotating by a locking spring having two stable positions, one corresponding to the up position of the dot, the other to its down position. At the end of the wire cooling phase, the rod and the wire occupy positions symmetrical from their positions at the beginning of the wire heating phase with respect to containing the dot axis and the cam axis. Each subsequent contraction-recovery cycle of the wire reverses the tactile dot position.

8 Claims, 4 Drawing Sheets

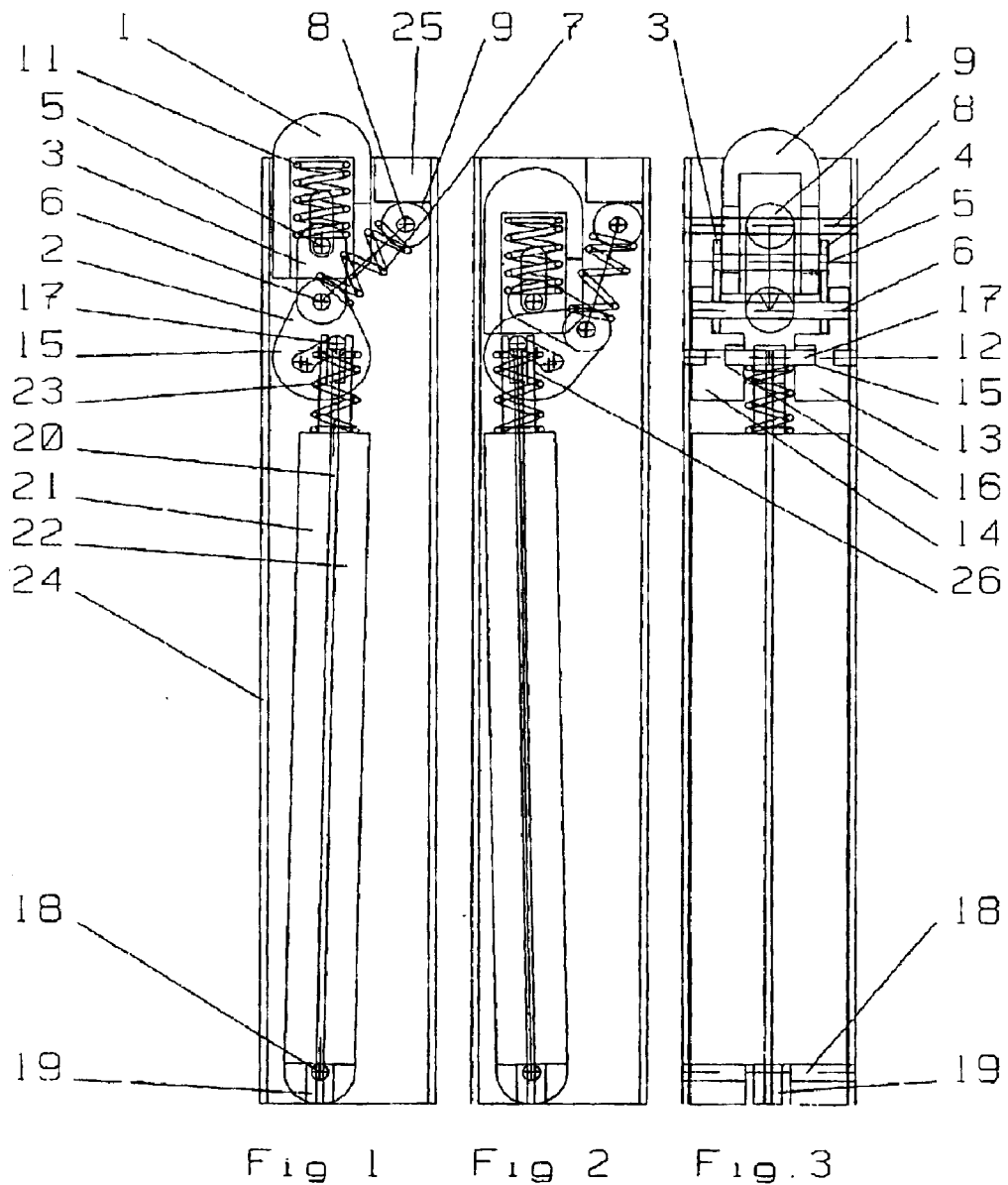

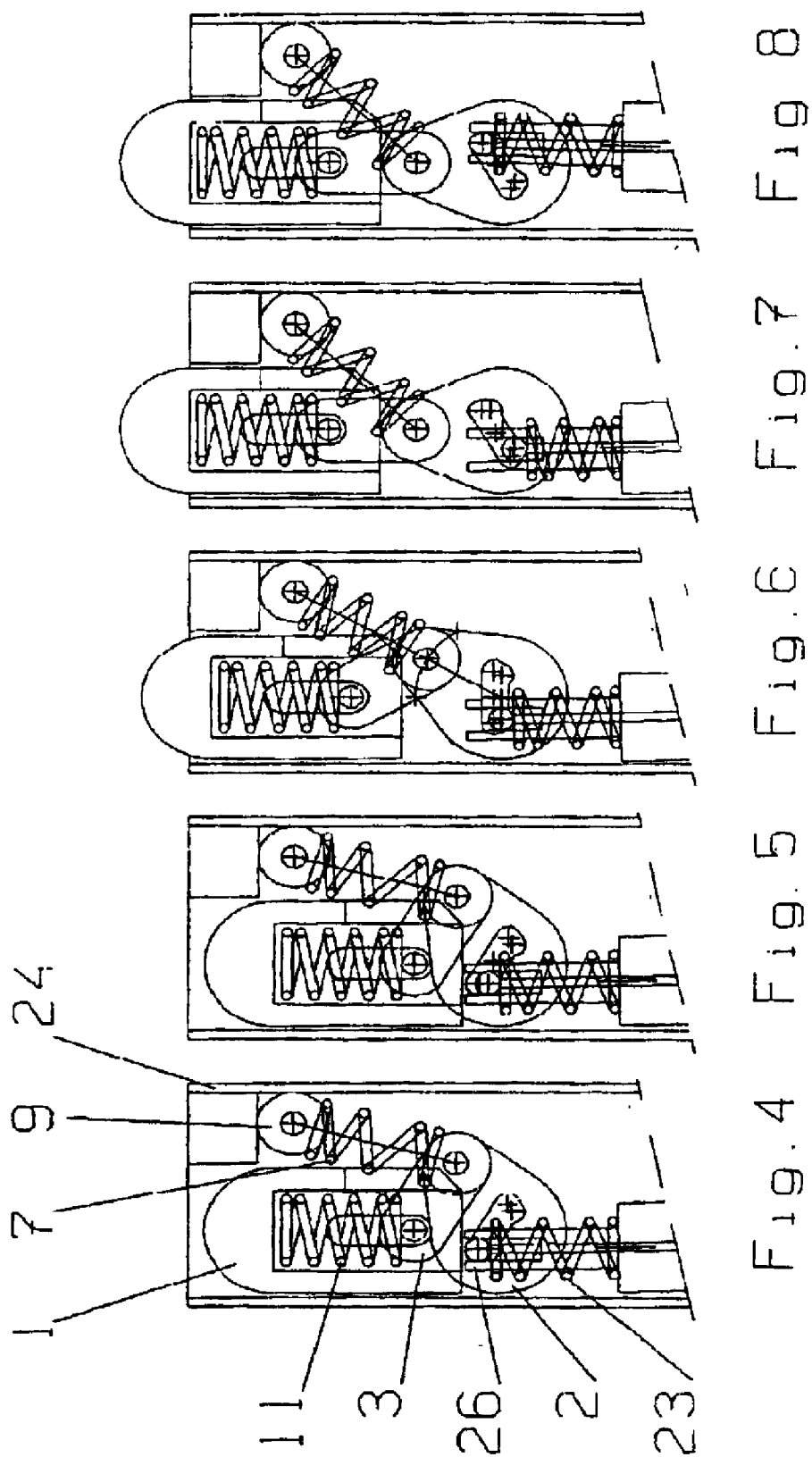

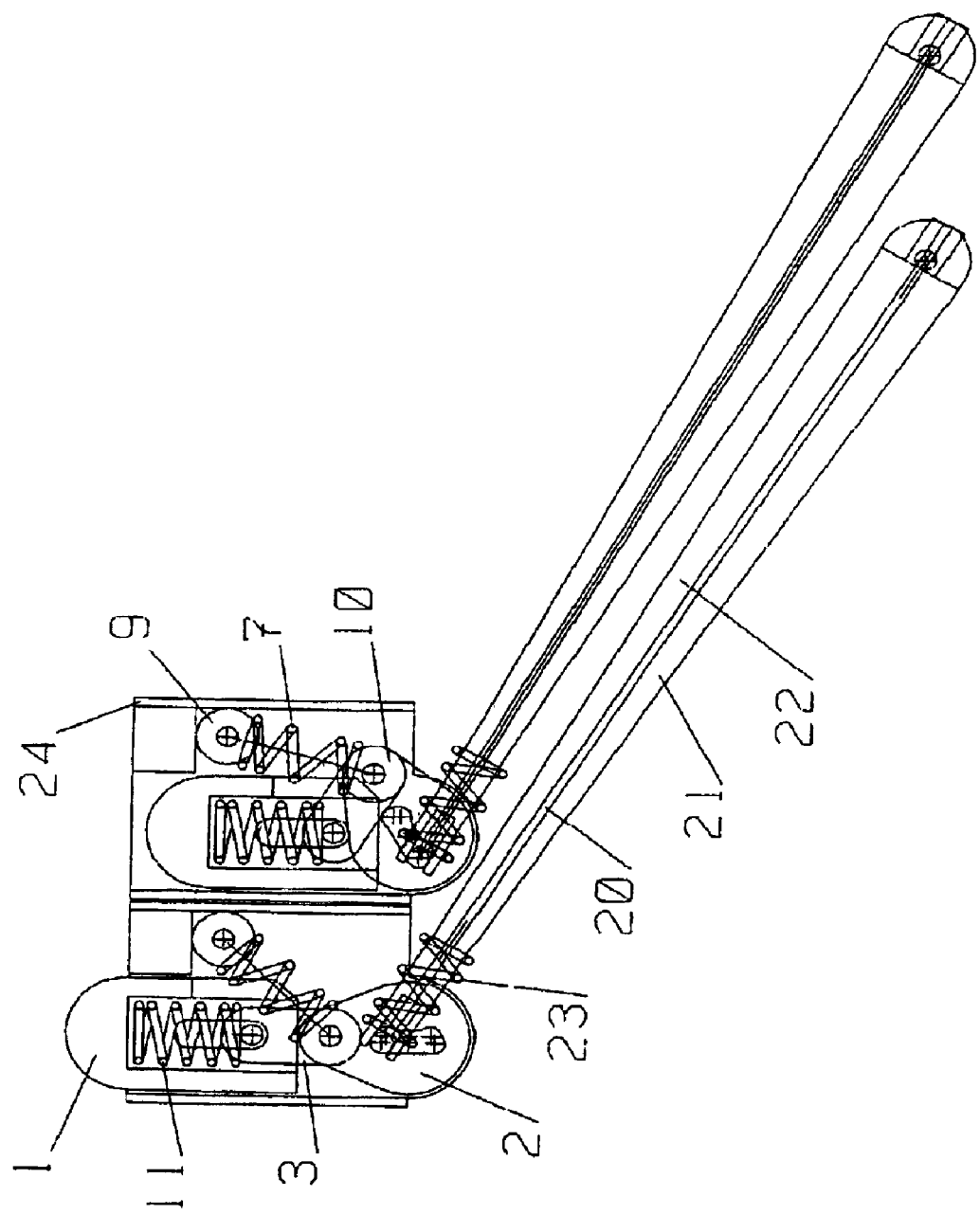

SINGLE DOT TACTILE READING MODULE DRIVEN BY A SHAPE MEMORY WIRE

FIELD OF THE INVENTION

The present invention concerns a single dot tactile reading module allowing, by juxtaposition of any number of similar modules, the construction of tactile displays combining Braille characters with regular dot arrays constituting tactile graphic arrays. The present invention more precisely relates to tactile displays in which the tactile dots are driven by shape memory wires.

BACKGROUND OF THE INVENTION

The present invention relates to tactile displays. These displays, designed for blind people, are made of a flat reading surface comprising small holes, arranged in a regular array of rows and columns, through which electromechanical drivers can raise or recess the hemispherical top of small cylindrical rods, in such a way that they represent, either Braille characters, or any other dot pattern to be read by touch.

DESCRIPTION OF THE PRIOR ART

Currently available tactile displays are built with tactile modules, comprising each 8 dots arranged in two columns of 4 dots, capable of representing 256 different dot combinations including all Braille characters as well as many other typographic signs. Practically all tactile modules available today, use as actuator a bimorph piezo-electric reed for each dot, placed with one end under the dot it activates, the reed being generally parallel to the reading surface. Given the length of the reed, such modules do not allow more than two adjacent Braille lines.

Moreover, in spite of being widely used, these modules are still expensive, because of the high cost of the piezoelectric reeds as well as the high cost of the electronic components needed to selectively apply 200 Volts or more to the reeds. An example of such a tactile display has been described in French Patent No. 8 408 143.

Many inventors have suggested the replacement of piezoelectric reeds by actuators using shape memory alloy wires, infinitely more compact and far less expensive for equivalent mechanical performances. Examples of such actuators are shown in U.S. Pat. Nos. 5,165,897 and 5,718,588. However, none of the tactile arrays commercially available today use shape memory actuators.

One can explain this situation by the following observations.

First, a piezo-electric reed is seen by the source of electric energy as a capacitor which does not consume any energy when the voltage applied to it and its capacitance remain constant. Therefore the piezo-electric actuator can maintain the dot in its up or down position practically without consuming any electrical energy. In contrast however, to maintain a shape memory actuator in its active—contracted—state, one must maintain the alloy above its transition temperature, which means that one must provide enough electric power to compensate the wire heat losses by a permanent Joule effect heat release. The corresponding electrical energy consumption being prohibitively high such an actuator can only be activated to change the dot position and not to maintain it. One must use a mechanical locking device to keep the dot in high- or low-position and an unlocking mechanism to return the dot to the opposite position.

Two solutions have been proposed: either a general unlocking of all active dots before refreshing the pattern on the tactile display, obtained with one or many separate electromechanical actuators, as proposed for example in U.S. Pat. No. 5,165,987, or a selective unlocking of only the active dots has to be changed to display the new pattern, obtained by means of an independent actuator for each tactile dot, as proposed for example in U.S. Pat. No. 5,718, 588.

The first solution, which unlocks unnecessary dots which could simply stay in the same position, wastes electrical energy and complicates the design of the tactile array by the presence of a special general unlocking device. The second solution requires two actuators for each dot and increases the number of mechanical and electrical parts. However, not wasting mechanical energy should be the first priority, because shape memory actuators have a much lower efficiency-ratio of mechanical energy provided to electrical energy consumed—than piezo-electric actuators.

SUMMARY OF THE INVENTION

It is an object of the present invention is to provide a single dot shape memory wire actuator module designed to minimize the mechanical energy necessary for an actuation cycle—dot moved up, then down—allowing the construction of tactile arrays, either Braille or graphic—regular array—or mixed, by simple juxtaposition of identical single dot modules.

It is another object of the present invention to allow the replacement of a defective actuator module without disassembly of the tactile array or the neighboring modules, in order to facilitate, speed-up and lower the cost of tactile array maintenance.

It is another object of the present invention to provide a low profile tactile module, meaning that the thickness—or height—of the tactile array, currently about one inch, can be reduced to about a quarter of an inch, allowing the implementation of such a tactile array in a wide range of portable or hand-held electronic devices.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a side view of the mechanical elements required for the operation of a single dot tactile module according to the present invention.

FIG. 2 illustrates the dot tactile module in a retracted position.

FIG. 3 is front view of the embodiment shown in FIG. 1.

FIGS. 4 through 8 illustrate the progression of extension of the single dot tactile reading module.

FIG. 9 illustrates an alternate embodiment showing an extended single dot tactile reading module.

FIG. 10 illustrates the single dot tactile reading module of FIG. 9 in a retracted position.

DETAILED DESCRIPTION OF THE PREFERRED EMBODIMENTS

Figures 11, 12, 13:
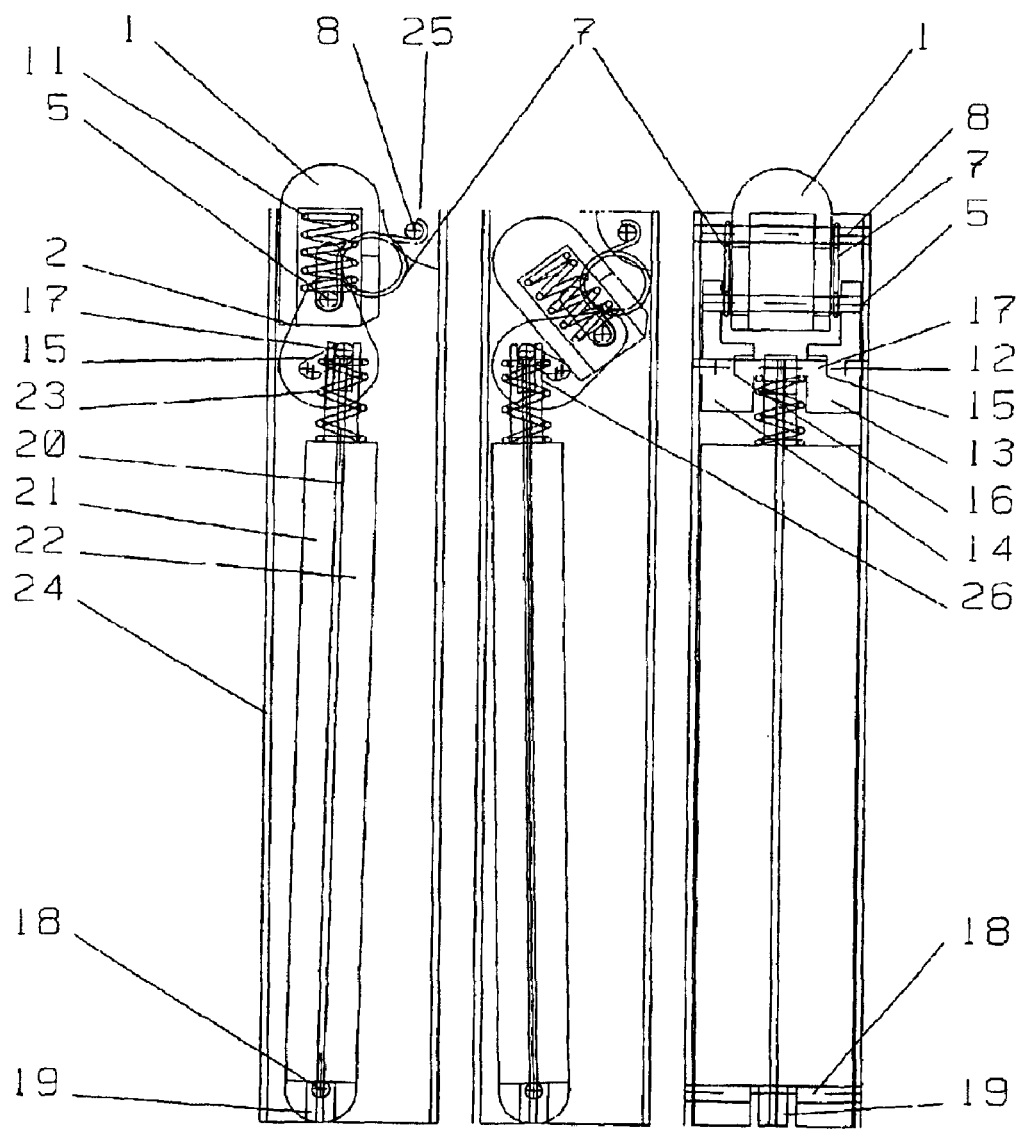
FIGS. 11 through 13 illustrate another alternate embodiment of the present invention similar in illustration to FIGS. 1 through 3 for showing extension and retraction of a single dot tactile reading module.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

A preferred embodiment of the present invention is shown in FIGS. 1 to 8. In this embodiment the module is designed in such a way that a single shape memory wire is needed to move the dot either up or down.

FIG. 1 represents a side view of all the mechanical elements required for the operation of a single dot tactile module in conformity with the present invention.

A deformable mechanical system is constituted by the following three main elements: a tactile dot 1 which can move vertically along its axis, a cam 2 which can rotate around its horizontal axis 12, a group of two levers 3 and 4, placed on both sides of the dot which can rotate, on one hand around a horizontal cylindrical rod 5 which goes through the dot 1 perpendicular to its axis and goes through one end of the levers 3 and 4 perpendicular to their plane surfaces, on the other hand around a horizontal cylindrical rod 6 which goes through the end of the cam 2 perpendicularly to its plane surface and goes through the other end of the levers 3 and 4 also perpendicularly to their plane surfaces. The axis of the rods 5 and 6 are parallel to the rotation axis 12 of the cam 2 and perpendicular to the axis of the dot 1.

If the cam 2 rotates around its axis 12, it produces a vertical motion of the dot 1 induced by equal and opposite rotations of the levers 3 and 4. When the dot 1 reaches its highest position, the axis 12 of the cam 2 and the axis of the cylindrical rods 5 and 6 all lie in the same vertical plane which also contains the axis of the dot 2. In this position, a vertical force applied downwards to the dot 1 is transferred through the levers 3 and 4 and through the rods 5 and 6 to the axis 12 of the cam 2 without generating a rotation torque either to the levers or to the cam, provided that the rod 5 is prevented from moving away from its equilibrium position by a properly designed locking device.

This bistable elastic locking device comprises a helicoidal spring 7 compressed between the cylindrical rod 6 and another cylindrical rod 8 around which it can rotate. Two pads 9 and 10 are transferring the pressure of the spring 7 to the rods 6 and 8 in such a way that the axis of the spring 7 is kept in the plane defined by the axis of the rods 6 and 8 halfway between their ends.

In order to limit the vertical force which can be applied to the mechanical parts by a finger pressure applied on the top of the dot 1 when it protrudes above the reading surface, the finger pressure applied on the dot 1 is transferred to the cylindrical rod 5 through a helicoidal spring 11 located inside the tactile dot 1. The spring 11 becomes fully compressed when, the dot 1 being in its high position, the finger pressure brings the top of the dot 1 flush with the reading surface. The corresponding compression force is chosen to provide an optimum stiffness—about 20 grams for a 0.7 mm compression—to the tactile dot.

When the dot 1 occupies its lowest position, the rods 5, 6 and the axis of the cam 2 are located at the summits of a triangle which has two equal sides represented by the levers 3 and 4. Its third, vertical, side is equal to twice the length of the levers 3 or 4 less the vertical travel of the dot 1 between its upper and lower positions. The deformable mechanical system is maintained in its lower position by the elastic bistable locking device which also maintains it in its upper position.

To move the dot 1 from its lower to its upper position, one has to rotate the cam 2 around its axis 12 by an angle equal to the base angles of the triangle described in the previous paragraph, in such a way that this angle is reduced finally to zero when the dot reaches its upper position. To move the dot 1 from its upper to its lower position, one has to rotate the cam 2 around its axis by the same angle in the opposite direction. These equal and opposite rotations can be generated by means of the contraction of a single shape memory wire as explained in the following paragraphs.

The cam 2 comprises two disks 13 and 14, located symmetrically from each other with respect to a vertical plane containing the axis of the dot 1 and perpendicular to the common axis of these disks. These disks carry, on their inside vertical plane surfaces, two slots 15 and 16 facing each other symmetrically with respect to the same vertical plane. These slots are made to be horizontal when the cam 2 is half way its maximum angle of rotation, when the dot 1 is on its way up or down.

A cylindrical rod 17 can slide inside these two slots in such a way that its axis remains parallel to the axis 12 of the disks 13 and 14.

A shape memory wire 20 has one end attached to the middle of the rod 17 and the other end attached to the middle of a cylindrical rod 18, placed in a fixed position below the rod 17 with its axis located in a vertical plane containing the axis 12 of the cam 2. The wire 20 is sandwiched between two identical plates 21 and 22 which can rotate together around the rod 18. A helicoidal spring 23 is slightly compressed between the cylindrical rod 17 and the upper faces of the plates 21 and 22. The upper part of theses plates penetrate inside the spring 23 in order to keep it centered around the wire 20, thus forming a fork 26 which helps the upper part of the plates 21 and 22 follow any horizontal motion of the rod 17.

The inside surface of the plates 21 and 22 is in close contact with the wire 20 along most of its length, in order to act as a heat sink to speed-up the cooling of the wire 20 and help it return quickly to its initial state after its heating and contraction phase. The plates 21 and 22 are therefore made of a heat conducting material, for example aluminum, while their inside surface is design to be an electrical insulator, for example by carrying a layer of aluminum oxide.

To improve the cooling speed by increasing the wire surface in contact with the plates 21 and 22, the preferred wire shape is a flat ribbon rather than a cylinder, with the minimal attainable thickness and therefore the maximum attainable width for a given wire cross section.

The initial length of the shape memory wire 20 is chosen to keep it straight with a minimal tension between the rods 17 and 18 when the rod 17 is located either in the upper left corner or the upper right corner of the slots 15 and 16 when the wire is cold, in its rest position.

In these positions, the spring 23 applies to the rod 17 a force which generates on the cam 2 a rotation torque while the spring 7 applies to the rod 6 a force which generates on the cam 2 a rotation torque in the opposite direction. The springs 7 and 23 are designed in such a way that the rotation torque generated by the spring 7 is slightly greater than the rotation torque generated by the spring 23. Thus the elastic bistable locking system constituted by the spring 7 compressed between the rods 6 and 8 keeps all mobile parts in one of the stable positions shown on FIG. 2—dot down—or FIG. 3—dot down—when the wire is cold and at its maximum—extended—length.

FIGS. 4 to 8 illustrate the way in which the mobile parts are moving from their position when the dot 1 is low as shown on FIG. 4, to their position when the dot 1 is high as shown on FIG. 8.

These figures only show the upper part of the tactile module in order to enlarge the parts which help explain its operation. It must be noted that the wire positions corresponding respectively to its cold state with the dot 1 up, and its cold state with the dot 1 down, are mirror images of each other with respect to the vertical plane containing the dot 1 axis and the cam axis 12. Similarly, the slots 15 and 16 positions corresponding respectively to the wire cold state with the dot 1 up, and its cold state with the dot 1 down, are mirror images of each other with respect to the same vertical plane. Therefore, the wire 20, the plates 21 and 22, the slots 15 and 16, the rod 17, are always moving from one position to its mirror image when the dot 1 moves either up or down.

It will now be described, in a more detailed way, the sequence of events when the dot 1 moves freely—no finger pressure applied to the top of the tactile dot—for example from its low position to its high position.

A current pulse of an intensity and a duration sufficient to generate by Joule effect the wire temperature increase needed to generate in the shape memory alloy a transition from its martensitic to its austenitic phase, is sent into the wire by appropriate electric means.

The phase transition produces a shortening of the wire which generates on the rod 17 a downward traction force.

During a first step, the shortening of the wire compresses the spring 23 and moves the rod 17 from the upper left corner to the lower left corner of the slots 15 and 16, where the rod 17 bumps into a semi-circular shaped corner of the slots 15 and 16. During this step, the cam 2 and the parts which she could drag stay in their initial positions.

During a second step, while the wire 20 continues to shorten and further compress the spring 23, the rod 17 which cannot slide out of the semi-circular shaped corner of the slots 15 and 16, pushes them down and produces a counter clockwise rotation of the cam 2, which in turn produces a rotation of the levers 3 and 4 by the same angle, but in opposite directions around the rod 5, pushing the dot 1 up. During this step, the rotation torque generated by the wire traction on the cam 2 overrides the lower rotation torque generated by the locking spring 7 in the opposite direction.

When the moving parts reach the positions shown on FIG. 6, the cam 2 has reached half of its maximum rotation angle and the torque produced by the spring 7 on the cam vanishes, as the rods 8, 6 and the cam axis 12 find themselves aligned in the same plane.

If nothing—for example a finger pressure on the dot 1—prevents the upward motion of the dot 1, until it moves up. Otherwise, the spring 11 is compressed generating on the cam 2 a rotation torque opposed to the cam rotation. In this case, the main part of the mechanical energy generated by the wire 20 contraction is used to compress the spring 11.

During a third step, the wire 20 continues to shorten and the downward motion of the rod 17 continues to produce a rotation of the cam 2, which continues to produce a rotation of the levers 3 and 4 around the rod 5 and continues either to push the dot 1 up or to compress the spring 11, if the dot 1 is prevented from moving up freely. During this third step, the rotation torque generated by the spring 7 on the cam 2 acts in the same direction as the rotation torque generated by the traction of the wire 20 and helps the continuation of the cam rotation.

At the end of this third step, the various mechanical parts are in the positions shown on FIG. 7. The wire 20 has finished its contraction, the cam 2 and the levers 3 and 4 have finished their respective rotations and the rod 17 finds itself still in the lower left corner of the slots 15 and 16.

Since the end of the electrical current pulse, the wire 20 has begun its cooling phase, which can be considerably shortened by the presence of the heat sinks 21 and 22. During the cooling phase, the length of the wire 20 begins to increase, aided by the vertical upwards push of the spring 12. During a fourth step, the rod 17 first bumps into the upper left corner of the slots 15 and 16 then, as the rotation torque generated by the locking spring 7 on the cam 2 is higher than the torque which can be generated on the cam 2 by the spring 23, the cam 2 is prevented from rotating back and the rod 17 starts to glide from left to right along the upper edge of the slots 15 and 16 to finally stop in the upper right corner of the slots as shown on FIG. 8.

If free to move up, the dot 1 has now reached its upper position. Otherwise, if the upward motion of the dot is prevented by a sufficient finger pressure on its top, the spring 11 has been fully compressed. As soon as the finger pressure is removed, the spring 11 will extend and bring the dot 1 in its upper position.

If another similar electric current pulse is now sent through the wire 20, its contraction will initiate a similar sequence of events with parts occupying successive positions symmetrical from the positions described in the above paragraphs, with respect to the plane containing the axis of the dot 1 and the axis 12 of the cam 2. Instead of moving up, the dot 1 will now move down and a complete up-down cycle will be achieved.

EXAMPLES OF OTHER EMBODIMENTS OF THE INVENTION

FIGS. 9 and 10 illustrate a slightly different layout of the parts composing the tactile module which goal is to reduce by about 50% the height of the tactile module. The new layout is obtained by a rotation of about 60 degrees, around the axis of the cam 2, of the following parts: the slots 15 and 16, the spring 23, the plates 21 and 22, the wire 20 and the rod 18 to which is attached the lower end of the wire 20.

The new layout operates exactly as described for FIGS. 4 to 8, the only change being that the thickness of the plates 21 and 22 decreases progressively from their lower part to their upper part, in order to prevent them from bumping into the space reserved for neighboring modules in the plane of FIGS. 9 and 10.

FIGS. 11 to 13 represent another embodiment of the present invention. In this embodiment, the tactile dot 1 is directly driven by the cam 2 through the rod 5 which goes through it and occupies during its motion, successive positions similar to those occupied by the levers 3 and 4 in FIGS. 1 to 3. This embodiment reduces the number of parts needed to build the tactile module and also reduces its vertical dimension.

When the hemispherical top of the tactile dot moves from its lower position on FIG. 11 to its upper position on FIG. 12, it glides on the vertical inner side of the module frame 24 and at the same time rotates around the rod 5 and around the center of its hemispherical top while moving progressively from an inclined to a vertical position.

The bistable elastic locking system is now made of two flat circular springs 7 compressed between the rod 5 and a cylindrical rod 8. The remaining module parts operate exactly as described previously in FIGS. 1 to 10.

It should be noted, on the FIGS. 1 to 3 and 9 to 13, that the lower part of the heat sink constituted by the plates 21 and 22 has a semi-cylindrical shape centered around the rod 18. This shape allows the heat sink to stay, if needed to shorten even more the wire cooling time, in thermal contact during its rotation with a complementary cooling system—for example a Peltier effect cooling system—comprising semi cylindrical concave slots for the heat sinks of each tactile module.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A single dot tactile reading module comprising:
   a frame supporting a tactile dot having a top portion movable in a direction parallel to an axis of the frame so that the top portion appears above a top of the frame in an up position of the tactile dot, and disappears below the top of the frame in a lower position of the tactile dot,
   means connecting said dot elastically with a cam which can rotate around an axis held by said frame in such a way that rotation of said cam in one direction produces an upward motion of said dot, and rotation of said cam in an opposite direction produces a downward motion of said dot,
   means for locking said dot elastically in two stable positions, either up or down, if no rotating torque is applied to said cam or if the rotating torque value is below a given reference value,
   means for rotating said cam comprising one shape memory wire implemented so that a contraction of the wire by electrical Joule heating generates a rotation of said cam which reverses the tactile dot position, moving it down if it is initially up and vice-versa,
   means for sending through said wire an electrical current pulse which produces in said wire by Joule effect enough heat to bring the wire above a phase transition temperature to make said wire contract,
   means for cooling said wire rapidly at an end of a contraction cycle to bring the wire back to an initial cold state,
   means for helping said wire recover an initial length and for bringing said wire in a position symmetrical from a previous initial position with respect to a plane containing the axis of said dot and the rotation axis of said cam, during the cooling phase so the helping means do not produce a rotation of said cam during the cooling phase, and
   means, located at a bottom of said frame, for electrically connecting both ends of said wire to a common printed circuit board in an easily removable manner.

2. The single dot tactile reading module according to claim 1, wherein the means elastically connecting said tactile dot with said cam comprise two levers, located symmetrically on each side of said dot, in planes parallel to said dot axis, said levers being able to rotate on one hand around a cylindrical rod going through said tactile dot perpendicular to its axis and going through one end of said levers perpendicular to their plane, and on the other hand around a cylindrical rod going through said cam parallel to its axis and going through the other end of said levers perpendicular to their plane, the upper cylindrical rod pulling said dot down directly but pushing said dot up elastically by a compression spring, said cylindrical rod axis, said cam axis and said dot axis being in a same vertical plane when said dot is in the up position.

3. The single dot tactile module according to claim 2, wherein a compression spring, located around said wire, is compressed between said sliding rod on one hand and said bottom fixed rod on the other hand in such a way that when said wire cools off it is aided in regaining its initial length by said compression spring which pushes upwards on said sliding rod and moves it to the other end of said slots where it reaches a position symmetrical from its initial position before the contraction of said wire, with respect to a vertical plane containing said dot axis and perpendicular to said cam axis, said cam being prevented from rotating by said elastic locking means.

4. The single dot tactile reading module according to claim 1, wherein one end of said shape memory wire is attached to a rod which can slide along two slots provided on internal faces of said cam to occupy two stable positions at either end of said slots while staying parallel to said cam axis, the other end of said shape memory wire being attached to another rod held in a fixed position at a bottom of said tactile dot frame, in such a way that said wire contraction, induced by electrical heating, produces a rotation of said cam due to rotation torque generated on said cam when said wire pulls down on said sliding rod.

5. The single dot tactile module according to claim 1, wherein the means used to speed up said wire cooling comprise two heat conducting plates in thermal contact with two opposite sides of said wire but electrically insulated from said wire, their plane being parallel to said cam axis in such a way as to be able to move sideways with said wire during its cooling phase by rotating around said bottom rod axis.

6. The single dot tactile module according to claim 1, wherein the means elastically connecting said tactile dot with said cam comprise a cylindrical rod going through said tactile dot perpendicular to its axis and going through said cam perpendicular to its faces, the rod pulling said dot down directly but pushing said dot up elastically by a compression spring, said cylindrical rod axis, said cam axis and said dot axis being in a same vertical plane when said dot is in the up position, said dot axis rotating in a direction opposite to said cam when said dot moves up or down, while said dot top portion is sliding along the inside vertical face of said frame.

7. The single dot tactile module according to claim 1, wherein the means involved in producing said cam rotation are, in their initial position, rotated by an angle equal to a maximum angle of rotation of said cam during its operation in order to significantly decrease the vertical size of said tactile module without preventing the juxtaposition of any number of modules in both directions with respect to the surface of the common board supporting said modules.

8. The single dot tactile module according to claim 1, wherein the bottom of said heat conducting plates has a semi-cylindrical shape with the same axis as said bottom rod, to be able to remain in thermal contact with similarly shaped supplementary cooling means using the Peltier effect located in immediate proximity to said common bottom board.

* * * * *